(12) United States Patent
Linden et al.

(10) Patent No.: US 12,423,803 B2
(45) Date of Patent: Sep. 23, 2025

(54) PREDICTING TOOL INDUCED SHIFT USING MOIRÉ OVERLAY TARGETS

(71) Applicant: KLA Corporation, Milpitas, CA (US)

(72) Inventors: Yatir Linden, Zichron Ya'akov (IL); Nadav Gutman, Zichron Ya'aqov (IL); Boaz Ophir, Milpitas, CA (US); Mark Ghinovker, Yoqneam Ilit (IL)

(73) Assignee: KLA Con, Milpitas, CA (US)

( * ) Notice: Subject to any disclaimer, the term of this patent is extended or adjusted under 35 U.S.C. 154(b) by 72 days.

(21) Appl. No.: 18/420,426

(22) Filed: Jan. 23, 2024

(65) Prior Publication Data

US 2025/0238917 A1    Jul. 24, 2025

(51) Int. Cl.
 G06T 7/00    (2017.01)
 G06T 7/73    (2017.01)

(52) U.S. Cl.
 CPC ............... *G06T 7/001* (2013.01); *G06T 7/73* (2017.01); *G06T 2207/30144* (2013.01)

(58) Field of Classification Search
 CPC ........... G01N 21/8851; G01N 21/9501; G01N 2021/8887; G01N 2201/0635; G01N 21/8806; G03F 7/70633; G03F 7/706845; G01B 11/26; G06T 7/001; G06T 7/73
 See application file for complete search history.

(56) References Cited

U.S. PATENT DOCUMENTS

| | | | |
|---|---|---|---|
| 10,705,435 B2 | 7/2020 | Yang et al. | |
| 11,164,307 B1 | 11/2021 | Feler et al. | |
| 11,355,375 B2 | 6/2022 | Volkovich et al. | |
| 11,410,290 B2 | 8/2022 | Ophir et al. | |
| 11,841,621 B2 | 12/2023 | Hill et al. | |
| 2019/0219930 A1* | 7/2019 | Yang | G03F 9/7019 |
| 2020/0241428 A1* | 7/2020 | Marciano | G03F 7/70491 |

(Continued)

FOREIGN PATENT DOCUMENTS

| KR | 1020230032478 A | 3/2023 | |
|---|---|---|---|
| WO | WO-2005114095 A2 * | 12/2005 | ......... G01B 11/2441 |

OTHER PUBLICATIONS

Amit et al., "Overlay Accuracy Calibration," Proc. SPIE 8681, Metrology, Inspection, and Process Control for Microlithography XXVII, 86811G, Apr. 18, 2013, 7 pages.

(Continued)

*Primary Examiner* — Samir A Ahmed
(74) *Attorney, Agent, or Firm* — Suiter Swantz IP

(57) ABSTRACT

A metrology system may receive one or more first images of an overlay target on a sample from a first detector, where the overlay target includes one or more Moiré structures, which may be formed as first-layer features and second-layer features that at least partially overlap and have different pitches. In the first images, the first-layer features and the second-layer features may be unresolved, but a Moiré pitch may be resolved. The system may further receive one or more second images of the overlay target from a second detector, where at least one of the first-layer features or the second-layer features are resolved in the one or more second images. The controller may generate a metrology measurement based on the one or more first images and generate a measurement of a systematic error associated with the metrology measurement based on the one or more second images.

35 Claims, 10 Drawing Sheets

(56) References Cited

U.S. PATENT DOCUMENTS

2021/0333218 A1\* 10/2021 Feler .................. G03F 7/70633
2022/0155693 A1   5/2022 Volkovich et al.
2023/0133640 A1   5/2023 Hill et al.
2023/0259040 A1   8/2023 Hill et al.
2023/0328351 A1  10/2023 Vaknin et al.

OTHER PUBLICATIONS

Kandel et al., "Overlay Accuracy Fundamentals," Metrology, Inspection, and Process Control for Microlithography XXVI, SPIE, vol. 8324, Apr. 5, 2012, 10 pages.

Ophir et al., "Machine learning for Tool Induced Shift (TIS) reduction: an HVM case study," Proc. SPIE 11611, Metrology, Inspection, and Process Control for Semiconductor Manufacturing XXXV, 116110E, Feb. 22, 2021, 8 pages.

Shusterman et al., "Machine learning robustness in overlay metrology," Proc. SPIE 12496, Metrology, Inspection, and Process Control XXXVII, 124960M, Apr. 27, 2023, 11 pages.

Watson et al., "Robustness improvement in imaging-based overlay metrology for high topography layers by Talbot targets," Proc. SPIE 11611, Metrology, Inspection, and Process Control for Semiconductor Manufacturing XXXV, 1161133, Feb. 22, 2021, 10 pages.

Korean Intellectual Property Office, International Search Report and Written Opinion received in International Application No. PCT/US2025/012274, Apr. 21, 2025, 8 pages.

\* cited by examiner

PREDICTING TOOL INDUCED SHIFT USING MOIRÉ OVERLAY TARGETS

TECHNICAL FIELD

The present disclosure relates generally to overlay metrology and, more particularly, to monitoring errors in overlay metrology measurements.

BACKGROUND

Overlay metrology provides measurements of a relative alignment of features fabricated with different lithographic exposures. However, overlay measurements may suffer from various errors or inaccuracies that may degrade the accuracy and/or sensitivity of the measurement. For example, tool induced shift (TIS) is a measure of the inaccuracy of a metrology tool that may be induced by non-uniform illumination among other systematic errors. There is therefore a need to develop systems and methods to address the above deficiencies.

SUMMARY

In embodiments, the techniques described herein relate to a metrology system, including a controller including one or more processors configured to execute program instructions stored in a memory device, where the program instructions are configured to cause the one or more processors to implement a metrology recipe by: receiving one or more first images of an overlay target on a sample from a first detector, where the overlay target includes one or more Moiré structures, where a respective one of the one or more Moiré structures includes first-layer features on a first layer of the sample and further includes second-layer features on a second layer of the sample, where the first-layer features and the second-layer features in the respective one of the one or more Moiré structures have different pitches and at least partially overlap, where the first-layer features and the second-layer features are unresolved in the one or more first images, where a Moiré pitch is resolved in the one or more first images; receiving one or more second images of the overlay target from a second detector, where at least one of the first-layer features or the second-layer features are resolved in the one or more second images; generating a metrology measurement based on the one or more first images; and generating a measurement of a systematic error associated with the metrology measurement based on the one or more second images.

In embodiments, the techniques described herein relate to a metrology system, where the program instructions are further configured to cause the one or more processors to implement the metrology recipe by controlling one or more process tools via one or more control signals based on the metrology measurement.

In embodiments, the techniques described herein relate to a metrology system, where the metrology measurement includes an overlay measurement.

In embodiments, the techniques described herein relate to a metrology system, where the systematic error includes a tool induced shift (TIS).

In embodiments, the techniques described herein relate to a metrology system, where receiving the one or more first images of the overlay target on the sample includes receiving the one or more first images of the overlay target on the sample, where receiving the one or more second images of the overlay target includes receiving the one or more second images of the overlay target from a second detector.

In embodiments, the techniques described herein relate to a metrology system, where at least one of the one or more first images and at least one of the one or more second images are generated simultaneously.

In embodiments, the techniques described herein relate to a metrology system, where generating the measurement of the systematic error associated with the metrology measurement based on the one or more second images includes generating the measurement of the systematic error with a machine learning model.

In embodiments, the techniques described herein relate to a metrology system, where the machine learning model is trained on images of training overlay targets generated at two angles separated by 180 degrees along with known values of the systematic error.

In embodiments, the techniques described herein relate to a metrology system, where generating the measurement of the systematic error associated with the metrology measurement based on the one or more second images includes generating the measurement of the systematic error with a closed form technique based on the one or more second images (e.g., evaluation of a merit function based on the one or more second images, or the like).

In embodiments, the techniques described herein relate to a metrology system, where generating the measurement of the systematic error with the closed form technique based on the one or more second images includes generating the measurement of the systematic error using one or more merit functions based on the one or more second images.

In embodiments, the techniques described herein relate to a metrology system, where the one or more first images are generated with a first wavelength, where the one or more second images are generated with a second wavelength.

In embodiments, the techniques described herein relate to a metrology system, where the overlay target provides the metrology measurement along one or more measurement directions, where the overlay target includes a first set of cells, where the first-layer features of the respective Moiré structures in the first set of cells have a pitch P and the second-layer features of the respective Moiré structures in the first set of cells have a pitch Q; and a second set of cells, where the first-layer features of the respective Moiré structures in the first set of cells have the pitch Q and the second-layer features of the respective Moiré structures in the first set of cells have the pitch P.

In embodiments, the techniques described herein relate to a metrology system, where the one or more Moiré structures includes two or more Moiré structures, where at least one of the two or more Moiré structures has periodicity along a first measurement direction, where at least one of the two or more Moiré structures is periodic along a second measurement direction different than the first measurement direction, where the metrology measurement includes a first metrology measurement associated with the first measurement direction and a second metrology measurement associated with the second measurement direction.

In embodiments, the techniques described herein relate to a metrology system, including an imaging sub-system including an illumination source configured to generate a first illumination beam with a first wavelength and a second illumination beam with a second wavelength; a first detector configured to image a sample with the first wavelength; and a second detector configured to image the sample with the second wavelength; and a controller communicatively coupled to the imaging sub-system, the controller including one or more processors configured to execute program instructions stored in a memory device, where the program instructions are configured to cause the one or more processors to implement a metrology recipe by: receiving one or more first images of an overlay target on the sample from the first detector, where the overlay target includes one or more Moiré structures, where a respective one of the one or more Moiré structures includes first-layer features on a first layer of the sample and further includes second-layer features on a second layer of the sample, where the first-layer features and the second-layer features in the respective one of the one or more Moiré structures have different pitches and at least partially overlap, where the first-layer features and the second-layer features are unresolved in the one or more first images, where a Moiré pitch is resolved in the one or more first images; receiving one or more second images of the overlay target from the second detector, where at least one of the first-layer features or the second-layer features are resolved in the one or more second images; generating a metrology measurement based on the one or more first images; and generating a measurement of a systematic error associated with the metrology measurement based on the one or more second images.

In embodiments, the techniques described herein relate to a metrology system, where the program instructions are further configured to cause the one or more processors to implement the metrology recipe by controlling one or more process tools via one or more control signals based on the metrology measurement.

In embodiments, the techniques described herein relate to a metrology system, where the metrology measurement includes an overlay measurement.

In embodiments, the techniques described herein relate to a metrology system, where the systematic error includes a tool induced shift (TIS).

In embodiments, the techniques described herein relate to a metrology system, where generating the measurement of the systematic error associated with the metrology measurement based on the one or more second images includes generating the measurement of the systematic error with a machine learning model.

In embodiments, the techniques described herein relate to a metrology system, where the machine learning model is trained on images of training overlay targets generated at two angles separated by 180 degrees along with known values of the systematic error.

In embodiments, the techniques described herein relate to a metrology system, where generating the measurement of the systematic error associated with the metrology measurement based on the one or more second images includes generating the measurement of the systematic error with a closed form technique based on the one or more second images (e.g., evaluation of a merit function based on the one or more second images, or the like).

In embodiments, the techniques described herein relate to a metrology system, where generating the measurement of the systematic error with the closed form technique based on the one or more second images includes generating the measurement of the systematic error using one or more merit functions based on the one or more second images.

In embodiments, the techniques described herein relate to a metrology system, where the one or more first images are generated with a first wavelength, where the one or more second images are generated with a second wavelength.

In embodiments, the techniques described herein relate to a metrology system, where the overlay target provides the metrology measurement along one or more measurement directions, where the overlay target includes a first set of cells, where the first-layer features of the respective Moiré structures in the first set of cells have a pitch P and the second-layer features of the respective Moiré structures in the first set of cells have a pitch Q; and a second set of cells, where the first-layer features of the respective Moiré structures in the first set of cells have the pitch Q and the second-layer features of the respective Moiré structures in the first set of cells have the pitch P.

In embodiments, the techniques described herein relate to a metrology system, where the one or more Moiré structures includes two or more Moiré structures, where at least one of the two or more Moiré structures has periodicity along a first measurement direction, where at least one of the two or more Moiré structures is periodic along a second measurement direction different than the first measurement direction, where the metrology measurement includes a first metrology measurement associated with the first measurement direction and a second metrology measurement associated with the second measurement direction.

In embodiments, the techniques described herein relate to a metrology method, including a controller including one or more processors configured to execute program instructions stored in a memory device, where the program instructions are configured to cause the one or more processors to implement a metrology recipe by: receiving one or more first images of an overlay target on a sample, where the overlay target includes one or more Moiré structures, where a respective one of the one or more Moiré structures includes first-layer features on a first layer of the sample and further includes second-layer features on a second layer of the sample, where the first-layer features and the second-layer features in the respective one of the one or more Moiré structures have different pitches and at least partially overlap, where the first-layer features and the second-layer features are unresolved in the one or more first images, where a Moiré pitch is resolved in the one or more first images; receiving one or more second images of the overlay target, where at least one of the first-layer features or the second-layer features are resolved in the one or more second images; generating a metrology measurement based on the one or more first images; and generating a measurement of a systematic error based on the one or more second images.

In embodiments, the techniques described herein relate to a metrology method, further including controlling one or more process tools via one or more control signals based on the metrology measurement.

In embodiments, the techniques described herein relate to a metrology method, where generating the metrology measurement based on the one or more first images includes generating an overlay measurement based on the one or more first images.

In embodiments, the techniques described herein relate to a metrology method, where generating the measurement of the systematic error based on the one or more second images includes generating a measurement of a tool induced shift (TIS) based on the one or more second images.

In embodiments, the techniques described herein relate to a metrology method, where generating the measurement of the systematic error based on the one or more second images includes generating the measurement of the systematic error with a machine learning model.

In embodiments, the techniques described herein relate to a metrology method, where the machine learning model is trained on images of training overlay targets generated at two angles separated by 180 degrees along with known values of the systematic error.

In embodiments, the techniques described herein relate to a metrology method, where generating the measurement of the systematic error associated with the metrology measurement based on the one or more second images includes generating the measurement of the systematic error with a closed form technique based on the one or more second images (e.g., evaluation of a merit function based on the one or more second images, or the like).

In embodiments, the techniques described herein relate to a metrology method, where generating the measurement of the systematic error with the closed form technique based on the one or more second images includes generating the measurement of the systematic error using one or more merit functions based on the one or more second images.

In embodiments, the techniques described herein relate to a metrology method, where the one or more first images are generated with a first wavelength, where the one or more second images are generated with a second wavelength.

In embodiments, the techniques described herein relate to a metrology method, where the overlay target provides the metrology measurement along one or more measurement directions, where the overlay target includes a first set of cells, where the first-layer features of the respective Moiré structures in the first set of cells have a pitch P and the second-layer features of the respective Moiré structures in the first set of cells have a pitch Q; and a second set of cells, where the first-layer features of the respective Moiré structures in the first set of cells have the pitch Q and the second-layer features of the respective Moiré structures in the first set of cells have the pitch P.

In embodiments, the techniques described herein relate to a metrology method, where the one or more Moiré structures includes two or more Moiré structures, where at least one of the two or more Moiré structures has periodicity along a first measurement direction, where at least one of the two or more Moiré structures is periodic along a second measurement direction different than the first measurement direction, where the metrology measurement includes a first metrology measurement associated with the first measurement direction and a second metrology measurement associated with the second measurement direction.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
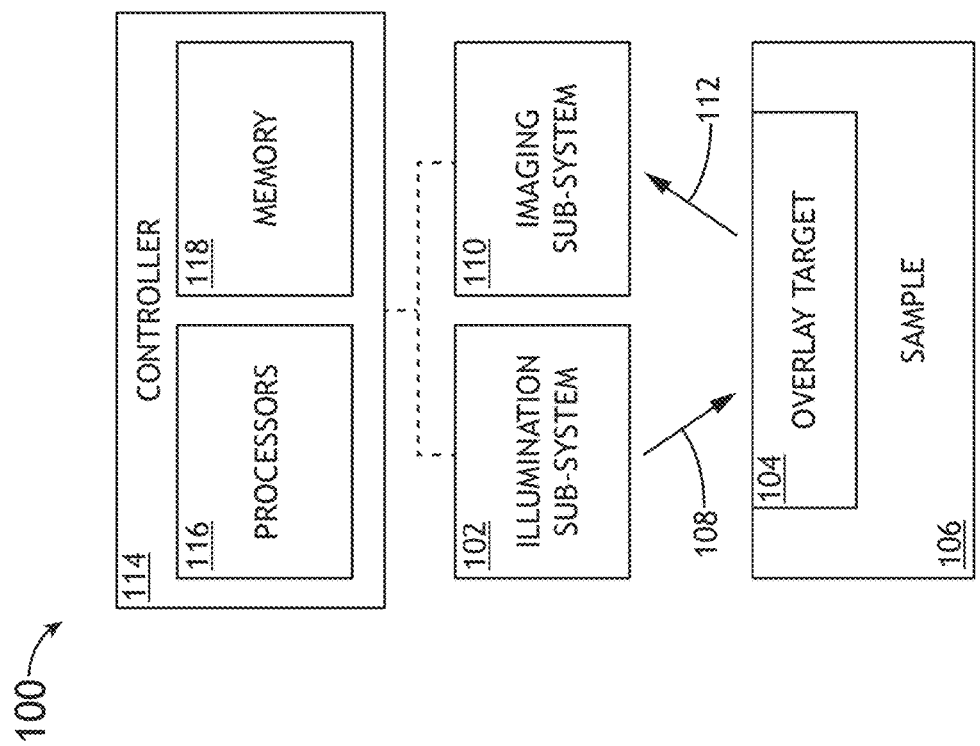
FIG. 1A is a block diagram depicting an overlay metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing both an overlay measurement of an overlay target including one or more Moiré structures and a measurement of systematic errors associated with the overlay measurement such as, but not limited to, tool induced shift (TIS). A Moiré structure may include overlapping periodic features with different pitches to form a grating-over-grating structure. Such an overlay target may be referred to herein as a robust advanced imaging metrology (r-AIM) target. Overlay metrology based on Moiré effects are generally described in U.S. Pat. No. 11,164,307 issued on Nov. 2, 2021; U.S. Pat. No. 10,705,435 issued on Jul. 7, 2020; U.S. Pat. No. 11,841,621 issued on Dec. 12, 2023; and U.S. Pat. No. 11,355,375 issued on Jun. 7, 2022; all of which are incorporated herein by reference in its entirety.

It is contemplated herein that an overlay target including one or more Moiré structures (e.g., an r-AIM target) may produce Moiré fringes having a Moiré pitch that is larger than the pitches of the grating-over-grating structure. Further, the positions of these Moiré fringes may be highly sensitive to the relative positions of the overlapping periodic features forming the Moiré structure and thus highly sensitive to overlay. In particular, a physical overlay error may induce a shift of the Moiré fringes by a gain factor associated with a difference between the pitches of the overlapping periodic features forming the Moiré structure. An overlay target including one or more Moiré structures may thus provide highly sensitive overlay measurements.

It is further contemplated herein that features observable in an image of such an overlay target may vary based on a wavelength of illumination used to form the image.

For example, there may exist a first range of wavelengths for which the Moiré fringes are observable, but the pitches of the periodic elements forming the Moiré structures are not resolvable (e.g., are below a resolution limit of an imaging system). Such an imaging regime is referred to herein as a Moiré regime and may be well-suited for generating overlay measurements. Since the underlying periodic features of the Moiré structures are not observable in the image, the signal to noise ratio (SNR) of the Moiré fringes (e.g., the visibility and/or contrast of the Moiré fringes) used as the basis of an overlay measurement may be relatively high.

As another example, there may exist a second range of wavelengths for which the pitches of the periodic elements forming the Moiré structures are resolvable (e.g., are within a resolution limit of an imaging system) and are thus observable in an image of the overlay target in addition to the Moiré fringes. Such an imaging regime is referred to herein as a non-Moiré regime. Since optical resolution scales with wavelength, this imaging regime utilizes lower wavelengths than the Moiré regime. Although this non-Moiré regime may provide relatively lower signal to noise ratios for overlay measurements than the Moiré regime, this non-Moiré regime may be well-suited for characterizing systematic measurement errors such as, but not limited to, TIS. In particular, the observability of the grating-over-grating structures may enable the observation of contrast variations indicative of illumination asymmetry or TIS more generally.

In embodiments, an overlay target including one or more Moiré structures (e.g., an r-AIM target) is imaged in both the Moiré regime and the non-Moiré regime. For example, one or more first images may be generated using a first wavelength associated with the Moiré regime, whereas one or more second images may be generated using a second wavelength associated with the non-Moiré regime. The first and second images (e.g., the Moiré-regime images and the non-Moiré-regime images) may be generated simultaneously with two-separate detectors or sequentially with a single detector. The one or more first images generated in the Moiré regime may then be used to generate one or more overlay measurements, whereas the one or more second images generated in the non-Moiré regime may be used to determine the systematic errors such as, but not limited to, TIS.

Systematic errors may be determined using any suitable technique based at least in part on one or more non-Moiré images of an overlay target with one or more Moiré structures.

For example, systematic errors may be determined using a closed form technique based on one or more non-Moiré images of Moiré structures. As an illustration, systematic errors such as TIS may be determined from two images of the overlay target taken in the non-Moiré regime under different illumination conditions having 180-degree symmetry. For instance, systemic errors may be determined based on a sum, difference, or other combination of two non-Moiré images generated at two different sample orientations (e.g., 0 degrees and 180 degrees). As another illustration, one or more merit functions providing values representative of systematic errors may be evaluated based on one or more non-Moiré images of Moiré structures. For instance, the value of the qMerit metric may be used to determine a presence and/or value of systematic errors based on one or more non-Moiré images. The qMerit metric is generally described in Kandel, Daniel, et al. "Overlay accuracy fundamentals." Metrology, Inspection, and Process Control for Microlithography XXVI. Vol. 8324. SPIE, 2012, which is incorporated herein by reference in its entirety. However, it is to be understood that any metric may or combination of metrics representative of the presence and/or value of any systematic error is within the spirit and scope of the present disclosure and that the qMerit function is merely illustrative.

As another example, a machine learning model may be trained to determine a value of a systematic error from an input image. As an illustration, such a machine learning model may be trained using images in a non-Moiré regime of training samples including Moiré structures taken with known errors. Once trained, the machine learning model may then determine a presence and/or a value of the systematic error using one or more non-Moiré images of an overlay target with Moiré structures. However, this is merely an illustration and should not be interpreted as limiting the scope of the present disclosure. The use of machine learning for metrology is generally described in U.S. Pat. No. 11,410, 290 issued on Aug. 9, 2022, which is incorporated herein by reference in its entirety.

Referring now to FIGS. 1A-9, systems and methods for characterizing both overlay and TIS are described in greater detail, in accordance with one or more embodiments of the present disclosure.

Figure 1B:
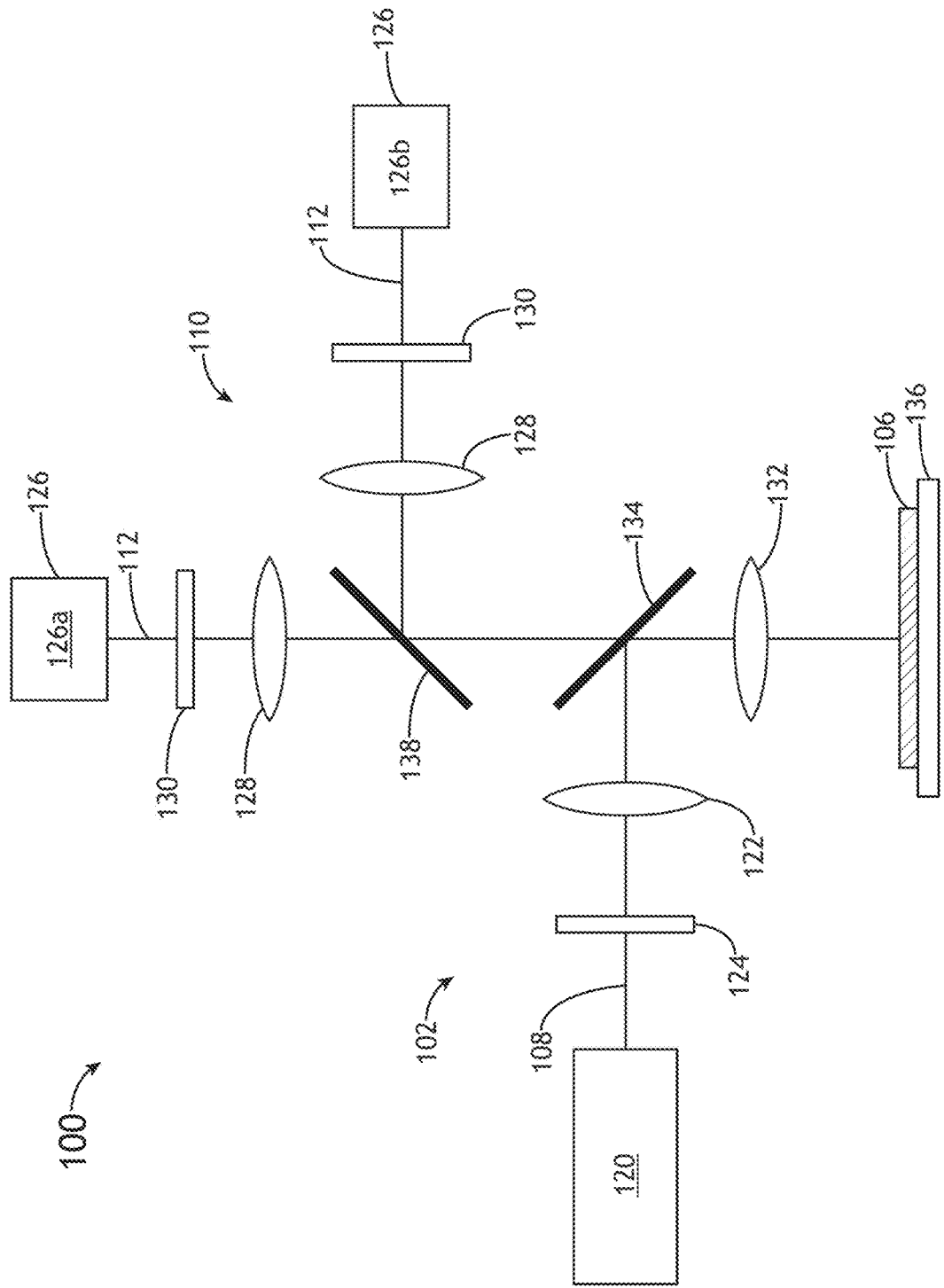
FIG. 1B is a simplified schematic of the overlay metrology system, in accordance with one or more embodiments of the present disclosure.

FIG. 1A is a block diagram depicting an overlay metrology system 100, in accordance with one or more embodiments of the present disclosure. In embodiments, an overlay metrology system 100 includes an illumination sub-system 102 configured to illuminate an overlay target 104 on a sample 106 with illumination 108 and an imaging sub-system 110 configured to generate one or more images of the sample 106. For example, the imaging sub-system 110 may collect light from the sample 106 (referred to herein as sample light 112) and image the overlay target 104 with at least a portion of the sample light 112. FIG. 1B is a simplified schematic of the overlay metrology system 100, in accordance with one or more embodiments of the present disclosure.

In embodiments, the overlay metrology system 100 includes a controller 114 including one or more processors 116 configured to execute program instructions maintained on memory 118, or memory medium. In this regard, the one or more processors 116 of controller 114 may execute any of the various process steps described throughout the present disclosure. Further, the controller 114 may be communicatively coupled to any component of the overlay metrology system 100 including, but not limited to, the illumination sub-system 102, the imaging sub-system 110, or any component therein.

The overlay metrology system 100 may be configurable to generate measurements based on any number of metrology recipes defining various aspects of the overlay target 104 (e.g., a target design) or measurement parameters of the imaging sub-system 110 suitable for generating an overlay measurement of a particular overlay target 104 with a particular target design. Put another way, the overlay metrology system 100 may be configured to provide a selected type of measurement for a selected overlay target design. For example, a metrology recipe may include various parameters associated with a design of the overlay target 104 such as, but not limited to, positions and orientations of sample features (e.g., pitches of grating features along particular directions). By way of another example, a metrology recipe may include various parameters associated with the position of the sample 106 during a measurement such as, but not limited to, a height, an orientation, whether the sample 106 is static during a measurement, or whether the sample 106 is in motion during a measurement (along with associated parameters describing the speed, scan pattern, or the like). By way of another example, a metrology recipe may include parameters of the illumination 108 such as, but not limited to, an illumination wavelength, an illumination pupil distribution (e.g., a distribution of illumination angles and associated intensities of illumination at those angles), a polarization of incident illumination, or a spatial distribution of illumination. By way of another example, a metrology recipe may include collection parameters associated with collection or filtering of the sample light 112 such as, but not limited to, a collection pupil distribution, collection field stop settings to select portions of the overlay target 104 of interest for imaging, a polarization of sample light 112, wavelength filters, or parameters for controlling one or more detectors.

Figure 2A:
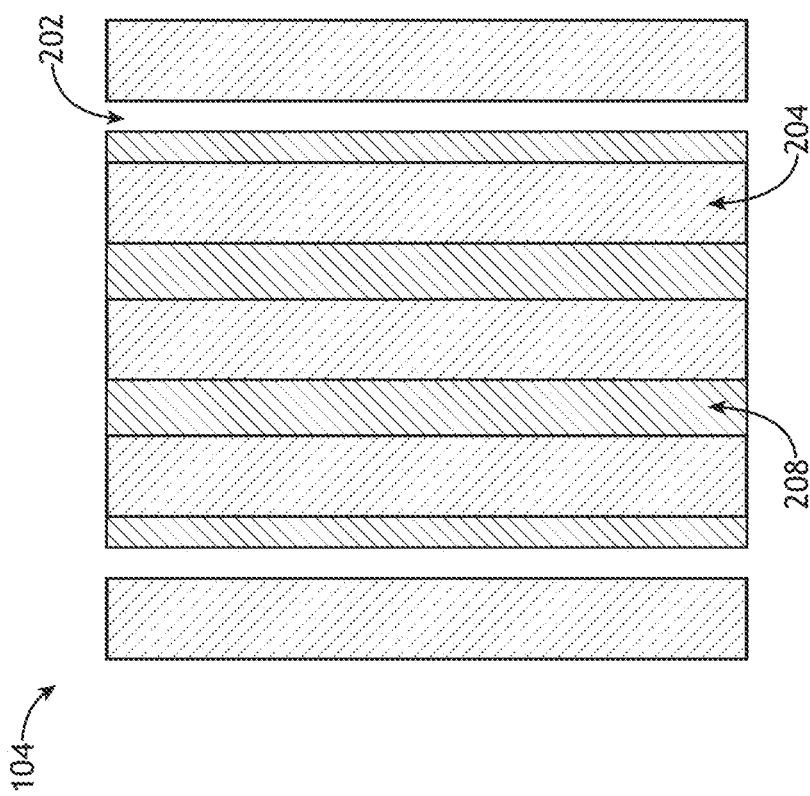
FIG. 2A is a simplified top view of a Moiré structure, in accordance with one or more embodiments of the present disclosure.
Figure 2B:
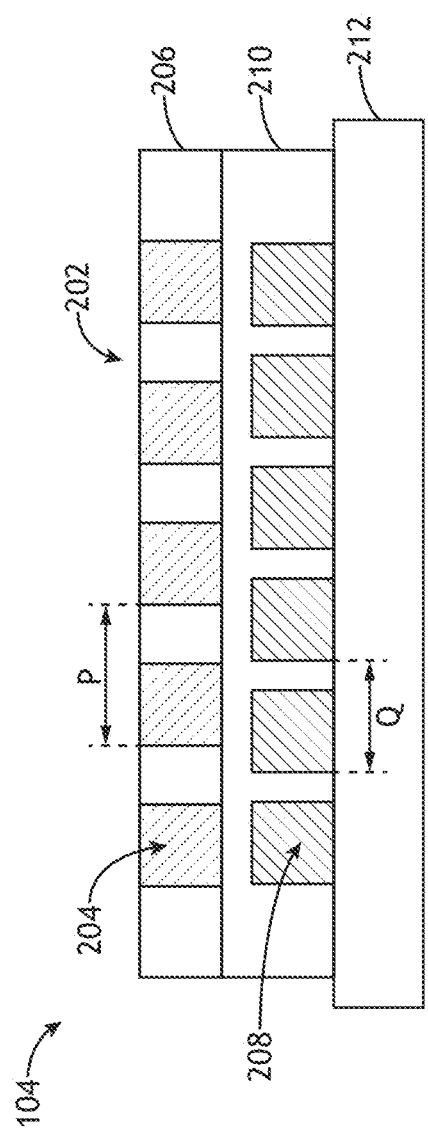
FIG. 2B is a simplified cross-sectional view of a Moiré structure, in accordance with one or more embodiments of the present disclosure.

FIG. 2A is a simplified top view of a Moiré structure 202, in accordance with one or more embodiments of the present disclosure. FIG. 2B is a simplified cross-sectional view of a Moiré structure 202, in accordance with one or more embodiments of the present disclosure.

In embodiments, a Moiré structure 202 includes first-layer features 204 on a first layer 206 of the sample 106 and second-layer features 208 on a second layer 210 of the sample 106, where the first-layer features 204 and the second-layer features 208 at least partially overlap. Further, the first-layer features 204 and the second-layer features 208 may be periodic with different pitches. For example, FIG. 2A depicts a configuration in which the first-layer features 204 have a pitch P and the second-layer features 208 have a pitch Q. As a result, the first-layer features 204 and the second-layer features 208 in regions of overlap may be together referred to as a grating-over-grating structure and may produce Moiré effects based on the different pitches.

The first layer 206 and the second layer 210 may be at any location within the sample 106. For example, as illustrated in FIG. 2B, the first-layer features 204 and the second-layer features 208 may be formed on a substrate 212. However, this is merely an illustration and should not be interpreted as limiting on the scope of the present disclosure. The sample 106 may include any number of additional layers between the first layer 206 and the second layer 210, and/or on either side of the first layer 206 or the second layer 210.

In embodiments, an overlay target 104 includes one or more Moiré structures 202, where the different Moiré structures 202 may have different configurations. For example, an overlay target 104 may include one or more pairs of Moiré structures 202 with inverted pitch configurations. As an illustration, an overlay target 104 may include a first Moiré structure 202 as depicted in FIGS. 2A and 2B in which the first-layer features 204 have pitch P and the second-layer features 208 have pitch Q (e.g., a P/Q or a P over Q Moiré structure 202), and may further include a second Moiré structure 202 in which the first-layer features 204 have pitch Q and the second-layer features 208 have pitch P (e.g., a Q/P or a Q over P Moiré structure 202). Such a pair of inverted Moiré structures 202 may provide various benefits including, but not limited to, self-configuration and/or self-calibration. Overlay metrology using pairs of inverted Moiré structures 202 are generally described in U.S. Pat. No. 10,705,435 issued on Jul. 7, 2020; and U.S. Pat. No. 11,841,621 issued on Dec. 12, 2023; both of which are incorporated herein by reference in their entireties. As another example, an overlay target 104 may include multiple Moiré structure 202 with the same configuration (e.g., as different cells). Such a configuration may be suitable for increasing an accuracy or robustness of a measurement.

Figure 2C:
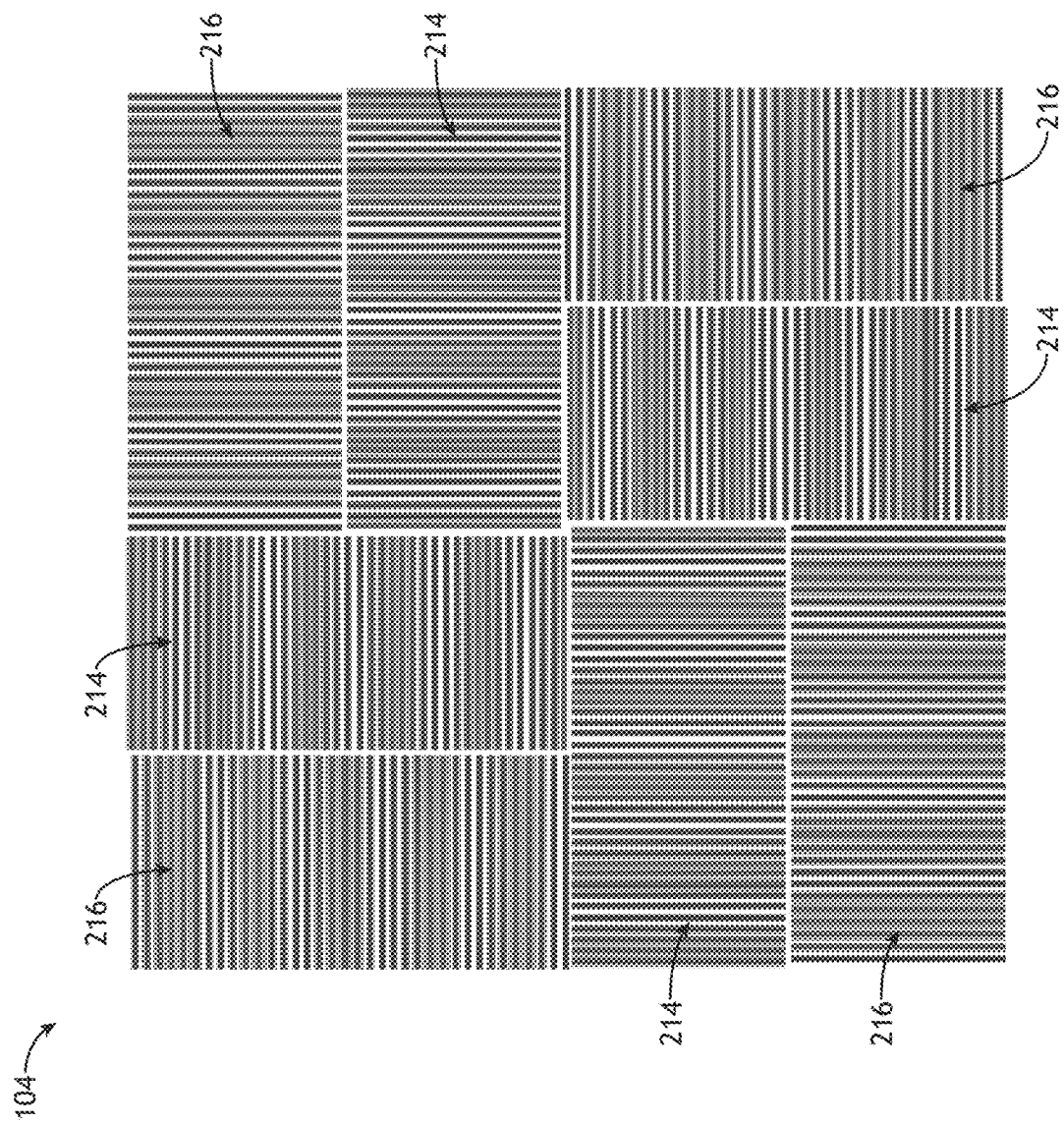
FIG. 2C is a top view of an overlay target including multiple Moiré structures, in accordance with one or more embodiments of the present disclosure.

FIG. 2C is a top view of an overlay target 104 including multiple Moiré structures 202, in accordance with one or more embodiments of the present disclosure. In particular, the overlay target 104 in FIG. 2C includes a first set 214 of cells with Moiré structures 202 having a P/Q configuration and a second set 216 of cells of Moiré structures 202 having a Q/P configuration.

Referring again to FIGS. 1A and 1B, additional aspects of the overlay metrology system 100 are described in greater detail, in accordance with one or more embodiments of the present disclosure.

In embodiments, the illumination sub-system 102 includes an illumination source 120 configured to generate illumination 108 to be directed to the sample 106. The illumination 108 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination 108 may further include any number of selected wavelengths or any ranges of selected wavelengths. For example, the illumination source 120 may simultaneously generate illumination 108 having multiple wavelengths, where at least one wavelength is suitable for imaging in a Moiré regime and at least one wavelength is suitable for imaging in an non-Moiré regime. As another example, the illumination source 120 may provide spectrally-tunable illumination 108 over a spectral range that includes at least one wavelength suitable for imaging in a Moiré regime and at least one wavelength suitable for imaging in a non-Moiré regime.

The illumination source 120 may further produce illumination 108 having any temporal profile. For example, the illumination source 120 may produce continuous-wave (CW) illumination 108, pulsed illumination 108, or modulated illumination 108. Additionally, the illumination 108 may be delivered via free-space propagation or guided light (e.g. an optical fiber, a light pipe, or the like).

The illumination source 120 may include any type of illumination source suitable for providing illumination 108 in the form of at least one illumination beam. In some embodiments, the illumination source 120 is a laser source. For example, the illumination source 120 may include, but is not limited to, one or more narrowband laser sources, a broadband laser source, a supercontinuum laser source, a white light laser source, or the like. In this regard, the illumination source 120 may provide illumination 108 having high coherence (e.g., high spatial coherence and/or temporal coherence). In some embodiments, the illumination source 120 includes a laser-sustained plasma (LSP) source. For example, the illumination source 120 may include, but is not limited to, a LSP lamp, a LSP bulb, or a LSP chamber suitable for containing one or more elements that, when excited by a laser source into a plasma state, may emit broadband illumination. In some embodiments, the illumination source 120 includes a lamp source. For example, the illumination source 120 may include, but is not limited to, an arc lamp, a discharge lamp, an electrode-less lamp, or the like. In this regard, the illumination source 120 may provide illumination 108 having low coherence (e.g., low spatial coherence and/or temporal coherence).

In embodiments, the illumination sub-system 102 includes one or more illumination sub-system lenses 122 (e.g., to collimate the illumination 108, to relay pupil and/or field planes, or the like). In some embodiments, the illumination sub-system 102 includes one or more illumination sub-system optics 124 to shape or otherwise control the illumination 108. For example, the illumination sub-system optics 124 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In embodiments, the imaging sub-system 110 includes various optical elements to collect the sample light 112 and image the sample 106 (e.g., image one or more overlay targets 104 on the sample 106) onto on one or more detectors 126. The imaging sub-system 110 may further include one or more optical elements suitable for modifying and/or conditioning the sample light 112 from the sample 106. In some embodiments, the imaging sub-system 110 includes one or more collection sub-system lenses 128 (e.g., to collimate the sample light 112, to relay pupil and/or field planes, or the like), which may include, but is not required to include, the objective lens 132. In some embodiments, the imaging sub-system 110 includes one or more collection sub-system optics 130 to shape or otherwise control the sample light 112. For example, the collection sub-system optics 130 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

The illumination sub-system 102 and the imaging sub-system 110 may be arranged in any configuration suitable for illuminating the sample 106 (e.g., illuminating one or more overlay targets 104 on the sample 106) and imaging the sample 106 (e.g., imaging one or more overlay targets 104 on the sample 106) based on at least a portion of collected sample light 112. For example, as depicted in FIG. 1B, the overlay metrology system 100 may include an objective lens 132 and a beamsplitter 134 to both direct illumination 108 to the sample 106 and collect sample light 112 from the sample 106 for imaging. As another example, the illumination sub-system 102 and the imaging sub-system 110 include separate optical elements for directing illumination 108 to the sample 106 and collecting sample light 112 from the sample 106 for imaging. Such optical elements may include objective lenses or any other suitable optical elements.

The overlay metrology system 100 may further include various components to position the sample 106 during imaging. For example, the overlay metrology system 100 may include one or more translation stages 136 to position the sample 106 with respect to the illumination 108, which may be secured by a chuck (not shown). A translation stage 136 may include any type of actuator known in the art and may provide motion along any direction or combination of directions. For instance, the overlay metrology system 100 may include any combination of linear, angular, or tip/tilt translation stages 136. As another example, the overlay metrology system 100 may include beam-scanning optics to position the illumination 108 with respect to the sample 106. Any suitable beam-scanning optics may be utilized including, but not limited to, translatable mirrors, an f-theta lens, or the like.

The imaging sub-system 110 may operate in a static measurement mode and/or a scanning measurement mode. In a static measurement mode, the sample 106 may be stationary relative to the illumination 108 during imaging. In a scanning measurement mode, the sample 106 may be in motion relative to the illumination 108 during imaging (e.g., via any combination of translation stages 136 or beam-scanning optics).

The imaging sub-system 110 may generally include any number or type of detectors 126 suitable for generating one or more images of a sample 106 either simultaneously or sequentially.

For example, FIG. 1B depicts a multi-channel configuration in which the imaging sub-system 110 includes two detectors 126 configured to separately image the sample 106 in Moiré and non-Moiré regimes. In this configuration, the imaging sub-system 110 may include a spectrally-sensitive beamsplitter 138 (e.g., a dichroic beamsplitter, or the like) to direct at least a first wavelength (or a first wavelength range) suitable for imaging the Moiré structures 202 of the overlay target 104 in a Moiré regime to a first detector 126a and further to direct at least a second wavelength (or a second wavelength range) suitable for imaging the Moiré structures 202 of the overlay target 104 in a non-Moiré regime to a second detector 126b. Further, the illumination source 120 may generate illumination 108 having at least the first wavelength and the second wavelength (or the first and second wavelength ranges) either simultaneously or sequentially such that the corresponding detectors 126a,b may generate images in the Moiré and non-Moiré regimes simultaneously or sequentially. However, it is noted that FIG. 1B and the associated description is provided merely for illustrative purposes and should not be interpreted as limiting. As an illustration, the imaging sub-system 110 may provide a single channel suitable for sequentially imaging the sample 106 in Moiré and non-Moiré regimes.

Any particular detector 126 within the imaging sub-system 110 may include any sensor suitable for imaging the sample 106. Further, any particular detector 126 may image the sample 106 while it is static with respect to the illumination 108 (e.g., in a static imaging mode) or while the sample 106 is in motion relative to the illumination 108 (e.g., in a scanning imaging mode). For example, a detector 126 may include a two-dimensional pixel array (e.g., a focal plane array) such as, but not limited to, a charge-coupled device (CCD) or a complementary metal-oxide semiconductor (CMOS) device. As another example, a detector 126 may include an array of single-pixel sensors such as, but not limited to, photodiodes. As another example, a detector 126 may include a time-delay integration (TDI) sensor.

Referring again to FIG. 1A, the one or more processors 116 of a controller 114 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 116 may include any device configured to execute algorithms and/or instructions (e.g., program instructions stored in memory). In some embodiments, the one or more processors 116 may be embodied as a desktop computer, mainframe computer system, workstation, image computer, parallel processor, networked computer, or any other computer system configured to execute a program configured to operate or operate in conjunction with the overlay metrology system 100, as described throughout the present disclosure. Moreover, different subsystems of the overlay metrology system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 114 may include one or more controllers housed in a common housing or within multiple housings. In this way, any controller or combination of controllers may be separately packaged as a module suitable for integration into overlay metrology system 100.

The memory 118 may include any storage medium known in the art suitable for storing program instructions executable by the associated one or more processors 116. For example, the memory 118 may include a non-transitory memory medium. By way of another example, the memory 118 may include, but is not limited to, a read-only memory (ROM), a random-access memory (RAM), a magnetic or optical memory device (e.g., disk), a magnetic tape, a solid-state drive and the like. It is further noted that the memory 118 may be housed in a common controller housing with the one or more processors 116. In some embodiments, the memory 118 may be located remotely with respect to the physical location of the one or more processors 116 and the controller 114. For instance, the one or more processors 116 of the controller 114 may access a remote memory (e.g., server), accessible through a network (e.g., internet, intranet and the like).

The controller 114 may direct (e.g., through control signals) or receive data from any components of the overlay metrology system 100. In this way, the controller 114 may execute or control the execution of any process steps disclosed herein. For example, the processors 116 of the controller 114 may be configured to execute program instructions stored on the memory 118, where the program instructions are configured to cause the processors 116 to execute or control the execution of any process steps disclosed herein.

Figure 3:
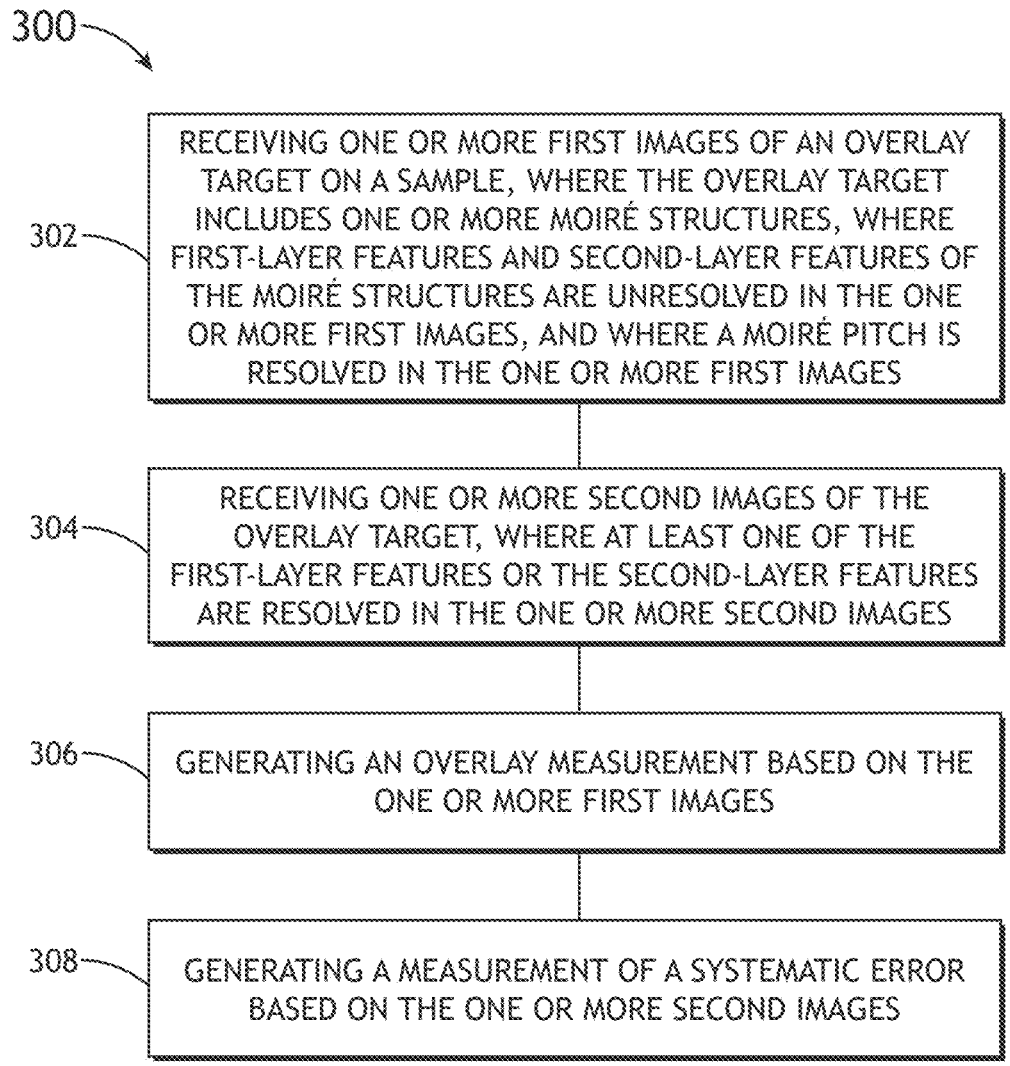
FIG. 3 is a flow diagram illustrating steps performed in a method for overlay metrology, in accordance with one or more embodiments of the present disclosure.

FIG. 3 is a flow diagram illustrating steps performed in a method 300 for overlay metrology, in accordance with one or more embodiments of the present disclosure. The embodiments and enabling technologies described previously herein in the context of the overlay metrology system 100 should be interpreted to extend to the method 300. For example, the processors 116 of the controller 114 in the overlay metrology system 100 may execute program instructions causing the one or more processors to implement and/or direct the implementation of any of the process steps of the method 300. However, the method 300 is not limited to the architecture of the overlay metrology system 100.

In embodiments, the method 300 includes a step 302 of receiving one or more first images of an overlay target 104 on a sample 106, where the overlay target 104 includes one or more Moiré structures 202, where first-layer features 204 and second-layer features 208 of the Moiré structures 202 are unresolved in the one or more first images, and where a Moiré pitch is resolved in the one or more first images. The one or more first images may thus be characterized as Moiré images associated with a Moiré regime.

In embodiments, the method 300 includes a step 304 of receiving one or more second images of the overlay target 104, where at least one of the first-layer features 204 or the second-layer features 208 are resolved in the one or more second images. The one or more second images may thus be characterized as non-Moiré images associated with a non-Moiré imaging regime.

The first and second images (e.g., the Moiré and non-Moiré images) associated with step 302 and step 304, respectively, may be generated using any suitable techniques. For example, the first images may be generated with a first wavelength (or first range of wavelengths) selected in combination with the pitches of the first-layer features 204 and the second-layer features 208 (e.g., in accordance with a metrology recipe) to provide imaging in the Moiré regime. Similarly, the second images may be generated with a second wavelength (or second range of wavelengths) selected in combination with the pitches of the first-layer features 204 and the second-layer features 208 (e.g., in accordance with a metrology recipe) to provide imaging in the non-Moiré regime.

Further, the first and second images (e.g., the Moiré and non-Moiré images) associated with step 302 and step 304, respectively, may be generated either simultaneously or sequentially. It is contemplated herein that simultaneous measurements (e.g., using an overlay metrology system 100 depicted in FIG. 1B or any other suitable system) may beneficially provide high measurement throughput for measurements of both overlay and systematic errors.

In embodiments, the method 300 includes a step 306 of generating an overlay measurement based on the one or more first images (e.g., one or more Moiré images). The overlay measurement of step 306 may be generated using any suitable technique. As an illustration considering the non-limiting configuration of an overlay target 104 shown in FIG. 2C, an overlay measurement may be generated based on positions of Moiré fringes in the first set 214 of cells with Moiré structures 202 having a P/Q configuration relative to the second set 216 of cells with Moiré structures 202 having a Q/P configuration. For example, a physical overlay error may cause shifts of the Moiré fringes in the first set 214 of cells along one direction and shifts of the Moiré fringes in the second set 216 of cells in an opposite direction. Further, the relative positions of the Moiré fringes between the first set 214 of cells and the second set 216 of cells may be determined using any suitable technique such as, but not limited to, determining a difference between centers of symmetry of the first set 214 of cells and the second set 216 of cells in the one or more first images.

In embodiments, the method 300 includes a step 308 of generating a measurement of a systematic error based on the one or more second images (e.g., one or more non-Moiré images). Any type of systematic error or combinations of systematic errors may be measured in step 308 such as, but not limited to, TIS. Further, a systematic error measured in step 308 may be determined using any suitable technique.

In embodiments, a measurement of a systematic error may be generated in step 308 using a closed form technique based on the one or more second images. For example, the step 308 may include combining two or more of the non-Moiré images generated at different orientations of the sample 106 with respect to the illumination 108 using a sum, difference, average, or any other combination providing information associated with one or more systematic errors of the overlay measurement generated in step 306. As another example, the step 308 may include generating a measurement of a systematic error based on a value of a metric applied to one or more of the non-Moiré images. Any suitable metric may be utilized including, but not limited to, the qMerit metric.

In embodiments, a measurement of a systematic error may be generated in step 308 using a machine learning model. Such a machine learning model may incorporate any type of machine learning technique or combination of machine learning techniques such as, but not limited to, supervised learning, unsupervised learning, semi-supervised learning, or reinforcement learning.

Non-limiting examples of supervised learning techniques include a support vector machine (SVM), a regression technique, a nearest neighbor technique (e.g., a k-nearest neighbor technique, a neural network, a linear discriminant analysis technique, or a Bayes technique (e.g., a Naïve Bayes technique). In a supervised learning technique, a machine learning model may be trained with a training dataset that includes images of overlay targets 104 including Moiré structures 202 (or images of Moiré structures 202 alone) having known values of the systematic error and generated in a non-Moiré regime. This training dataset may include data from any suitable source including, but not limited to, simulated data and/or experimental data associated with fabricated samples 106 with known or measured values of the systematic error. Once trained, such a machine learning model may generate a measurement of the systematic error based on one or more images of an overlay target 104 (or one or more Moiré structures 202 thereon) generated in non-Moiré regime.

Non-limiting examples of unsupervised techniques include clustering techniques, anomaly detection techniques, or latent variable modeling techniques. In an unsupervised learning technique, a machine learning model may be trained based on an unlabeled training dataset including images of overlay targets 104 including Moiré structures 202 (or images of Moiré structures 202 alone) generated in a non-Moiré regime and having different but unlabeled values of the systematic error. The machine learning model may then utilize any technique to identify patterns in this data such that the model may generate a measurement of systematic error based on one or more images of an overlay target 104 (or one or more Moiré structures 202 thereon) generated in non-Moiré regime.

In semi-supervised learning, a combination of supervised learning and unsupervised learning may be combined to balance the relatively time-consuming process of supervised training with unsupervised learning of potentially larger training datasets.

In reinforcement learning, a machine learning model may learn a policy that optimizes a reward function (or cost function). Non-limiting techniques may include value function techniques, brute force techniques, or policy search techniques. As an example, predictions a systematic error determined by a machine learning model based on one or more input images of overlay targets 104 including Moiré structures 202 (or images of Moiré structures 202 alone) generated in a non-Moiré regime may be evaluated. The machine learning model may then use these evaluations when optimizing a reward function (or cost function) to continue learning.

It is to be understood that the descriptions of machine learning models above are provided solely for illustrative purposes and should not be interpreted as limiting the scope of the present disclosure. Rather, any machine learning technique suitable for determining a systematic error measurement based on one or more images of an overlay target 104 including Moiré structures 202 (or images of the Moiré structures 202) is within the spirit and scope of the present disclosure.

Additionally, though not shown in FIG. 3, the method 300 may include a step of controlling one or more process tools via one or more control signals based on the output overlay measurement. Any type of process tool is within the spirit and scope of the present disclosure and may include, but is not limited to, a lithography tool (e.g., a scanner, a stepper, or the like), an etching tool, or a polishing tool. The control signals may further provide any combination of feedback and/or feed-forward control. For example, feedback control may be used to compensate for process deviations for samples within a lot. As another example, feed-forward control may be used to adjust future steps performed on a given sample in response to a measured overlay error.

Referring now to FIGS. 4-9, generating overlay measurements and TIS measurements using the method 300 is described, in accordance with one or more embodiments of the present disclosure.

It is contemplated herein that TIS is a systematic error associated with the overlay metrology system 100 and adversely affects the accuracy of overlay results. However, the effects of TIS may be identified and corrected to improve the overlay results.

Typical techniques for measuring and correcting for TIS are based on capturing images of a sample 106 (e.g., of an overlay target 104 on a sample 106) at two orientation angles separated by 180 degrees. However, the requirement of imaging at different orientation angles suffers from significant reduction in measurement time and thus overall throughput.

It is contemplated herein that machine learning models may be used to generate TIS measurements based on a single image of an overlay target 104 including Moiré structures 202 and may thus provide substantially increased throughput compared to techniques requiring images at multiple orientation angles. It is further contemplated herein that a non-Moiré image (e.g., an image in which at least first-layer features 204 or second-layer features 208 constituting a Moiré structure 202 are resolved) may provide a relatively robust basis for training and implementing TIS measurements using machine learning techniques. As described with respect to the method 300, embodiments of the present disclosure are directed to capturing one or more non-Moiré images for the purpose of estimating systematic errors such as TIS as well as capturing one or more Moiré images for the purpose of overlay determination. Such a configuration may thus provide efficient measurements of both overlay and systematic errors, particularly when the Moiré and non-Moiré images are captured simultaneously with an overlay metrology system 100 such as, but not limited to, that depicted in FIG. 1B.

FIGS. 4-9 depict multi-wavelength measurements and simulations associated with overlay and TIS measurements in Moiré and non-Moiré regimes, in accordance with one or more embodiments of the present disclosure. In particular, the overlay target 104 simulated in FIGS. 4-9 includes Moiré structures 202 formed with pitches of 400 nm and 500 nm.

Figure 4:
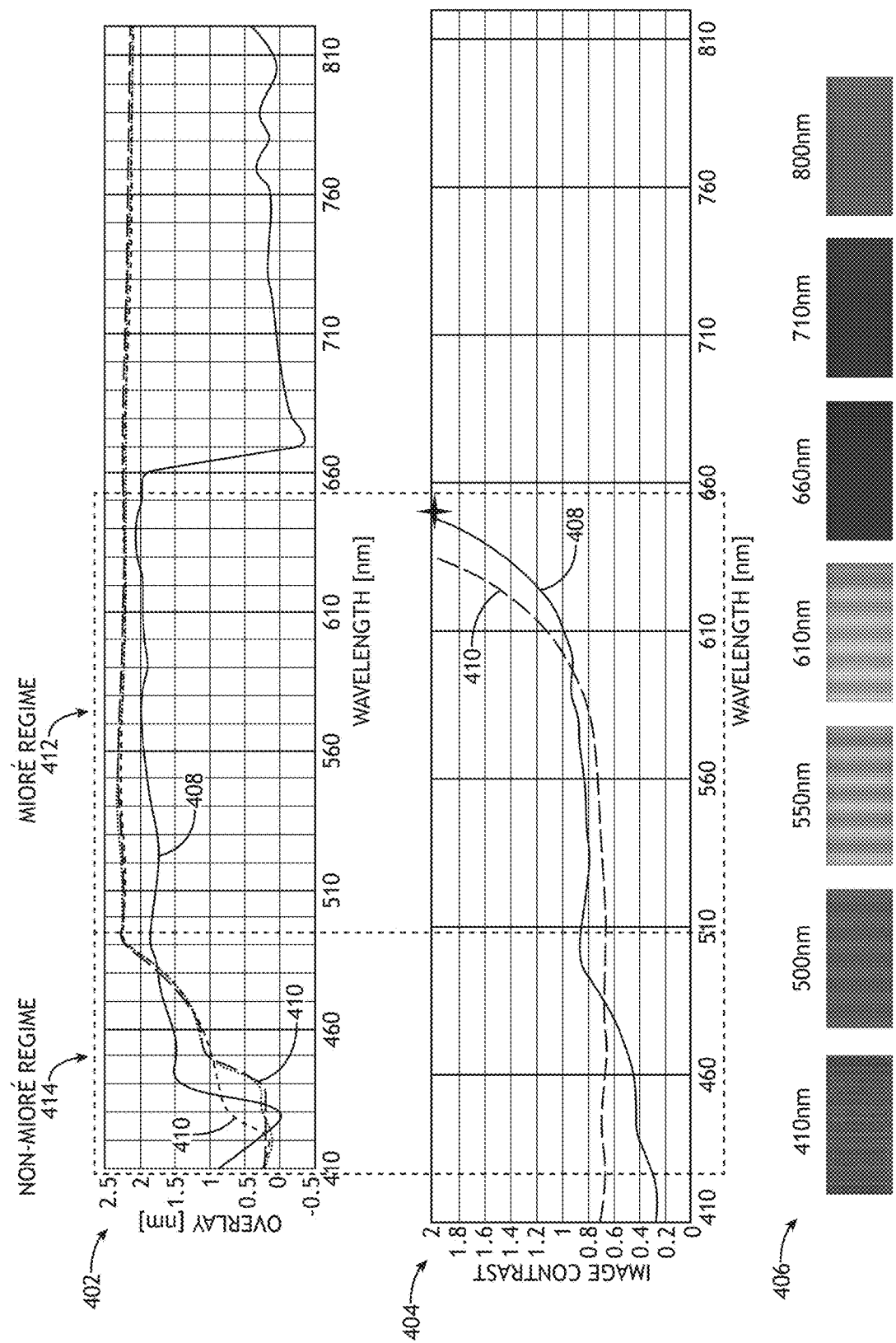
FIG. 4 includes plots illustrating overlay and contrast measurements of an overlay target including Moiré structures, in accordance with one or more embodiments of the present disclosure.

FIG. 4 includes plots illustrating overlay and contrast measurements of an overlay target 104 including Moiré structures 202, in accordance with one or more embodiments of the present disclosure. Plot 402 depicts overlay measurements across a wavelength range of 410 nm to 801 nm, while plot 404 depicts contrast measurements of Moiré fringes (at a Moiré pitch) across the same wavelength range. Panel 406 includes a series of images of a Moiré structure 202 associated with the overlay target 104 at different indicated wavelengths. Further, both measured values 408 and various simulated values 410 in the presence of different process variations are shown.

As illustrated in FIG. 4, the pitches of at least some of the grating-over-grating features forming the Moiré structure 202 are visible for wavelengths below approximately 490 nm, but are visible at higher wavelengths. As an illustration, the image of the Moiré structure 202 generated at 410 nm depicts the grating-over-grating structures, whereas the images generated at wavelengths of 500 nm and higher do not. Further, the contrast of the Moiré fringes generally drops off for decreasing wavelengths below approximately 490 nm due at least in part to the visible grating-over-grating structures.

Notably, the contrast of the Moiré fringes is relatively stable for wavelengths in a range of 490 nm to 610 nm, at which point the contrast increases sharply until the Moiré fringes are no longer resolvable at wavelengths of approximately 650 nm. FIG. 4 thus depicts a Moiré region 412 in a wavelength range at which the grating-over-grating structures of the Moiré structure 202 are not resolvable up to a wavelength at which the Moiré fringes are not resolvable. Wavelengths below this range are labeled as a non-Moiré region 414.

It is further noted that overlay measurement is stable across the Moiré region and degrades for decreasing wavelength in the non-Moiré region due at least in part to the reduced contrast shown in plot 402.

FIGS. 5-9 depict the results of simulations of modeled data to visualize both Moiré and non-Moiré regimes.

In order to model TIS, two different simulations were implemented opposing asymmetric sidewall angles (ASWAs) to simulate imaging of a sample 106 at different angular orientations of a sample 106 separated by 180 degrees.

Figure 5:
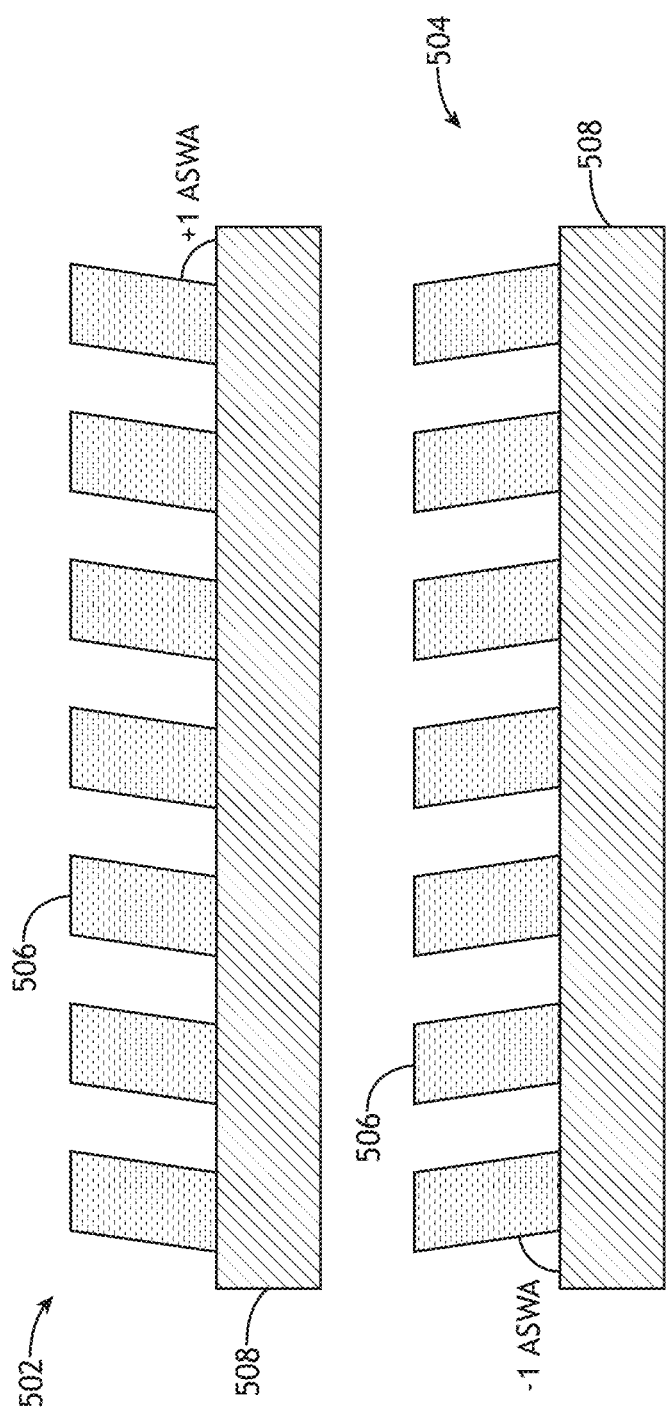
FIG. 5 depicts features with asymmetric sidewall angles, in accordance with one or more embodiments of the present disclosure.

FIG. 5 depicts features with asymmetric sidewall angles, in accordance with one or more embodiments of the present disclosure. In particular, panel 502 depicts a configuration with +1 ASWA, whereas panel 504 depicts a configuration with −1 ASWA. It is noted that FIG. 5 depicts only a single layer of features 506 on a substrate 508. In a Moiré structure 202, the first-layer features 204 and the second-layer features 208 may each have ASWA of potentially different values and/or orientations.

Figure 6:
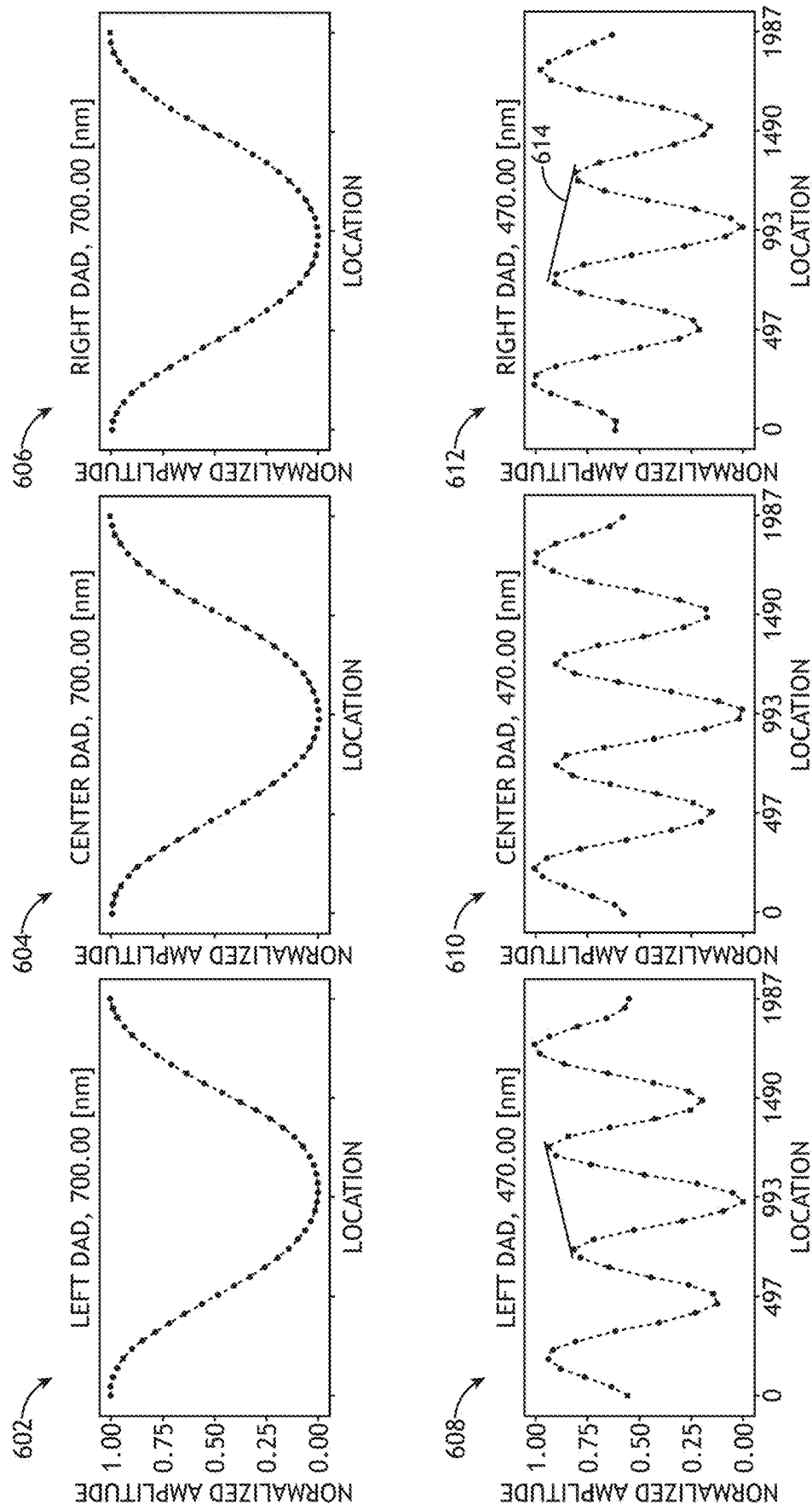
FIG. 6 is a series of plots depicting simulated one-dimensional signals associated with images of a Moiré structure having AWSA when imaged in a Moiré regime and a non-Moiré regime, in accordance with one or more embodiments of the present disclosure.

FIG. 6 is a series of plots depicting simulated one-dimensional (1D) signals associated with images of a Moiré structure having AWSA when imaged in a Moiré regime and a non-Moiré regime, in accordance with one or more embodiments of the present disclosure. In particular, plots 602-606 depict 1D signals associated with images of a Moiré structure generated in a Moiré regime at a wavelength of 700 nm with left, center, and right dual aperture device (DAD) positions, respectively. The varying DAD positions simulate telecentricity aberration associated with TIS. Further, plots 608-612 depict 1D signals associated with images of a Moiré structure generated in a non-Moiré regime at a wavelength of 470 nm with left, center, and right DAD positions, respectively. As demonstrated in FIG. 6, the asymmetry simulated by varying DAD positions is clearly visible in plots 608-612 generated in the non-Moiré regime, but are substantially less noticeable in plots 602-606 generated in the Moiré regime. The lines 614 in the plots provide a visual aid associated with this asymmetry. FIG. 6 thus provides a demonstration that images of a Moiré structure 202 in a non-Moiré regime may be well suited for measurements of systematic errors, whereas images of the Moiré structure 202 in the Moiré regime may be well-suited for overlay measurements.

Figure 7:
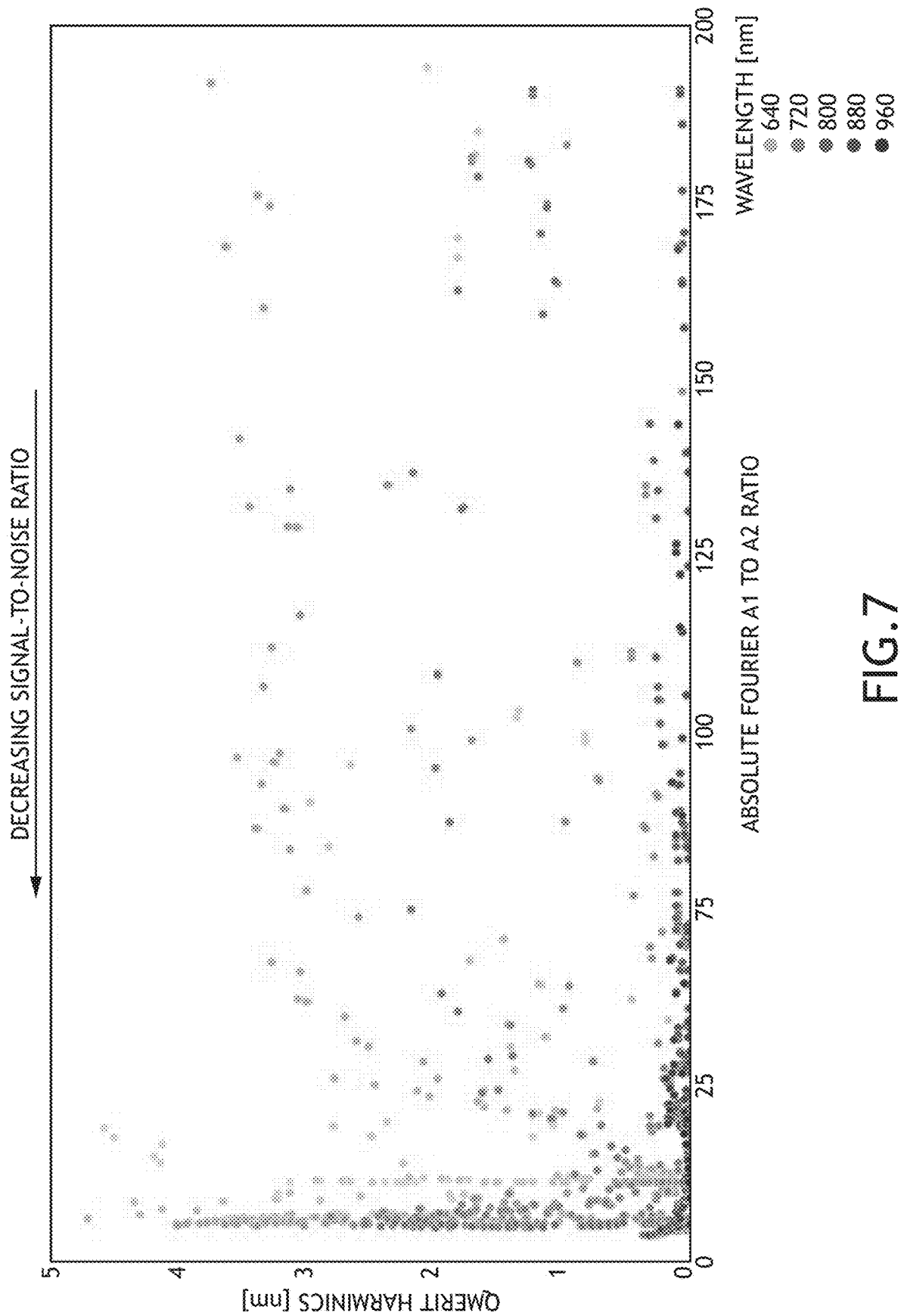
FIG. 7 is a plot depicting absolute qMerit values as a function of the absolute Fourier coefficients used to determine SNR associated with a for a variety of DAD variations and process variations as a function of wavelength, in accordance with one or more embodiments of the present disclosure.

FIG. 7 depicts evaluations of measurable asymmetry using a qMerit performance metric. It is noted that the use of the qMerit metric is used here solely to illustrate measurable asymmetries and should not be interpreted as limiting the scope of the present disclosure.

The qMerit metric may be performed by the steps of (1) fitting a signal to a periodic kernel into the first eight orders of a Fourier series representation, (2) applying a Fourier Transform on the resulting kernel approximation, (3) calculating a center of symmetry (CoS) of the kernel using cross-correlation of the original kernel and its reverse, (4) taking a first derivative of the kernel and applying the procedure of (3), and (5) subtracting the CoS of step (3) from the CoS of step (4).

A SNR is an additional useful merit to assess the validity of a measurement. When a 1D signal from an image is a perfect sine or cosine function, it can be mathematically described as Fourier series where the first harmonic equals one and the higher harmonics equal zero. Thus, a good proxy of the signal-to-noise ratio can be written as the first cosine Fourier coefficient (a1) divided by the second coefficient (a2). The higher this ratio, the lower the SNR. The precision of an overlay measurement (e.g., a standard deviation of overlay measurements) decreases with increasing SNR.

FIG. 7 is a plot depicting absolute qMerit values as a function of the absolute Fourier coefficients (e.g., a1 and a2) used to determine SNR associated with a Moiré structure 202 for a variety of DAD variations and process variations as a function of wavelength, in accordance with one or more embodiments of the present disclosure. In FIG. 7, SNR decreases to the left of the plot on the X axis. Further, relatively lower wavelengths provide higher qMerit values coupled with lower SNRs and are thus well-suited for determining systematic errors, whereas relatively higher wavelengths provide relatively lower qMerit values coupled with relatively higher SNRs. In this way, FIG. 7 further illustrates how decreasing a wavelength used to image a Moiré structure 202 to transition from the Moiré regime to a non-Moiré regime may improve the ability to evaluate systematic errors such as TIS, which is in agreement with FIG. 6.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system, comprising:
a controller including one or more processors configured to execute program instructions stored in a memory device, wherein the program instructions are configured to cause the one or more processors to implement a metrology recipe by:
receiving one or more first images of an overlay target on a sample from a first detector, wherein the overlay target comprises:
one or more Moiré structures, wherein a respective one of the one or more Moiré structures includes first-layer features on a first layer of the sample and further includes second-layer features on a second layer of the sample, wherein the first-layer features and the second-layer features in the respective one of the one or more Moiré structures have different pitches and at least partially overlap, wherein the first-layer features and the second-layer features are unresolved in the one or more first images, wherein a Moiré pitch is resolved in the one or more first images;
receiving one or more second images of the overlay target from a second detector, wherein at least one of the first-layer features or the second-layer features are resolved in the one or more second images;
generating a metrology measurement based on the one or more first images; and
generating a measurement of a systematic error associated with the metrology measurement based on the one or more second images.

2. The metrology system of claim 1, wherein the program instructions are further configured to cause the one or more processors to implement the metrology recipe by controlling one or more process tools via one or more control signals based on the metrology measurement.

3. The metrology system of claim 1, wherein the metrology measurement comprises:
an overlay measurement.

4. The metrology system of claim 1, wherein the systematic error comprises:
a tool induced shift (TIS).

5. The metrology system of claim 1, wherein receiving the one or more first images of the overlay target on the sample comprises receiving the one or more first images of the overlay target on the sample, wherein receiving the one or more second images of the overlay target comprises receiving the one or more second images of the overlay target from a second detector.

6. The metrology system of claim 5, wherein at least one of the one or more first images and at least one of the one or more second images are generated simultaneously.

7. The metrology system of claim 1, wherein generating the measurement of the systematic error associated with the metrology measurement based on the one or more second images comprises:
generating the measurement of the systematic error with a machine learning model.

8. The metrology system of claim 7, wherein the machine learning model is trained on images of training overlay targets generated at two angles separated by 180 degrees along with known values of the systematic error.

9. The metrology system of claim 1, wherein generating the measurement of the systematic error associated with the metrology measurement based on the one or more second images comprises:
generating the measurement of the systematic error with a closed form technique based on the one or more second images.

10. The metrology system of claim 9, wherein generating the measurement of the systematic error with the closed form technique based on the one or more second images comprises:
generating the measurement of the systematic error using one or more merit functions based on the one or more second images.

11. The metrology system of claim 1, wherein the one or more first images are generated with a first wavelength, wherein the one or more second images are generated with a second wavelength.

12. The metrology system of claim 1, wherein the overlay target provides the metrology measurement along one or more measurement directions, wherein the overlay target includes:
a first set of cells, wherein the first-layer features of the respective Moiré structures in the first set of cells have a pitch P and the second-layer features of the respective Moiré structures in the first set of cells have a pitch Q; and
a second set of cells, wherein the first-layer features of the respective Moiré structures in the first set of cells have the pitch Q and the second-layer features of the respective Moiré structures in the first set of cells have the pitch P.

13. The metrology system of claim 1, wherein the one or more Moiré structures includes two or more Moiré structures, wherein at least one of the two or more Moiré structures has periodicity along a first measurement direction, wherein at least one of the two or more Moiré structures is periodic along a second measurement direction different than the first measurement direction, wherein the metrology measurement includes a first metrology measurement associated with the first measurement direction and a second metrology measurement associated with the second measurement direction.

14. A metrology system, comprising:
an imaging sub-system comprising:
an illumination source configured to generate a first illumination beam with a first wavelength and a second illumination beam with a second wavelength;
a first detector configured to image a sample with the first wavelength; and
a second detector configured to image the sample with the second wavelength; and
a controller communicatively coupled to the imaging sub-system, the controller including one or more processors configured to execute program instructions stored in a memory device, wherein the program instructions are configured to cause the one or more processors to implement a metrology recipe by:
receiving one or more first images of an overlay target on the sample from the first detector, wherein the overlay target comprises:
one or more Moiré structures, wherein a respective one of the one or more Moiré structures includes first-layer features on a first layer of the sample and further includes second-layer features on a second layer of the sample, wherein the first-layer features and the second-layer features in the respective one of the one or more Moiré structures have different pitches and at least partially overlap, wherein the first-layer features and the second-layer features are unresolved in the one or more first images, wherein a Moiré pitch is resolved in the one or more first images;

receiving one or more second images of the overlay target from the second detector, wherein at least one of the first-layer features or the second-layer features are resolved in the one or more second images;

generating a metrology measurement based on the one or more first images; and generating a measurement of a systematic error associated with the metrology measurement based on the one or more second images.

15. The metrology system of claim 14, wherein the program instructions are further configured to cause the one or more processors to implement the metrology recipe by controlling one or more process tools via one or more control signals based on the metrology measurement.

16. The metrology system of claim 14, wherein the metrology measurement comprises:
an overlay measurement.

17. The metrology system of claim 14, wherein the systematic error comprises:
a tool induced shift (TIS).

18. The metrology system of claim 14, wherein generating the measurement of the systematic error associated with the metrology measurement based on the one or more second images comprises:
generating the measurement of the systematic error with a machine learning model.

19. The metrology system of claim 18, wherein the machine learning model is trained on images of training overlay targets generated at two angles separated by 180 degrees along with known values of the systematic error.

20. The metrology system of claim 14, wherein generating the measurement of the systematic error associated with the metrology measurement based on the one or more second images comprises:
generating the measurement of the systematic error with a closed form technique based on the one or more second images.

21. The metrology system of claim 20, wherein generating the measurement of the systematic error with the closed form technique based on the one or more second images comprises:
generating the measurement of the systematic error using one or more merit functions based on the one or more second images.

22. The metrology system of claim 14, wherein the one or more first images are generated with a first wavelength, wherein the one or more second images are generated with a second wavelength.

23. The metrology system of claim 14, wherein the overlay target provides the metrology measurement along one or more measurement directions, wherein the overlay target includes:
a first set of cells, wherein the first-layer features of the respective Moiré structures in the first set of cells have a pitch P and the second-layer features of the respective Moiré structures in the first set of cells have a pitch Q; and
a second set of cells, wherein the first-layer features of the respective Moiré structures in the first set of cells have the pitch Q and the second-layer features of the respective Moiré structures in the first set of cells have the pitch P.

24. The metrology system of claim 14, wherein the one or more Moiré structures includes two or more Moiré structures, wherein at least one of the two or more Moiré structures has periodicity along a first measurement direction, wherein at least one of the two or more Moiré structures is periodic along a second measurement direction different than the first measurement direction, wherein the metrology measurement includes a first metrology measurement associated with the first measurement direction and a second metrology measurement associated with the second measurement direction.

25. A metrology method, comprising:
a controller including one or more processors configured to execute program instructions stored in a memory device, wherein the program instructions are configured to cause the one or more processors to implement a metrology recipe by:
receiving one or more first images of an overlay target on a sample, wherein the overlay target comprises:
one or more Moiré structures, wherein a respective one of the one or more Moiré structures includes first-layer features on a first layer of the sample and further includes second-layer features on a second layer of the sample, wherein the first-layer features and the second-layer features in the respective one of the one or more Moiré structures have different pitches and at least partially overlap, wherein the first-layer features and the second-layer features are unresolved in the one or more first images, wherein a Moiré pitch is resolved in the one or more first images;
receiving one or more second images of the overlay target, wherein at least one of the first-layer features or the second-layer features are resolved in the one or more second images;
generating a metrology measurement based on the one or more first images; and
generating a measurement of a systematic error based on the one or more second images.

26. The metrology method of claim 25, further comprising:
controlling one or more process tools via one or more control signals based on the metrology measurement.

27. The metrology method of claim 25, wherein generating the metrology measurement based on the one or more first images comprises:
generating an overlay measurement based on the one or more first images.

28. The metrology method of claim 25, wherein generating the measurement of the systematic error based on the one or more second images comprises:
generating a measurement of a tool induced shift (TIS) based on the one or more second images.

29. The metrology method of claim 25, wherein generating the measurement of the systematic error based on the one or more second images comprises:
generating the measurement of the systematic error with a machine learning model.

30. The metrology method of claim 29, wherein the machine learning model is trained on images of training overlay targets generated at two angles separated by 180 degrees along with known values of the systematic error.

31. The metrology method of claim 25, wherein generating the measurement of the systematic error associated with the metrology measurement based on the one or more second images comprises:
generating the measurement of the systematic error with a closed form technique based on the one or more second images.

32. The metrology method of claim 25, wherein generating the measurement of the systematic error with the closed form technique based on the one or more second images comprises:
generating the measurement of the systematic error using one or more merit functions based on the one or more second images.

33. The metrology method of claim 25, wherein the one or more first images are generated with a first wavelength, wherein the one or more second images are generated with a second wavelength.

34. The metrology method of claim 25, wherein the overlay target provides the metrology measurement along one or more measurement directions, wherein the overlay target includes:

a first set of cells, wherein the first-layer features of the respective Moiré structures in the first set of cells have a pitch P and the second-layer features of the respective Moiré structures in the first set of cells have a pitch Q; and a second set of cells, wherein the first-layer features of the respective Moiré structures in the first set of cells have the pitch Q and the second-layer features of the respective Moiré structures in the first set of cells have the pitch P.

35. The metrology method of claim 25, wherein the one or more Moiré structures includes two or more Moiré structures, wherein at least one of the two or more Moiré structures has periodicity along a first measurement direction, wherein at least one of the two or more Moiré structures is periodic along a second measurement direction different than the first measurement direction, wherein the metrology measurement includes a first metrology measurement associated with the first measurement direction and a second metrology measurement associated with the second measurement direction.

* * * * *

UNITED STATES PATENT AND TRADEMARK OFFICE
CERTIFICATE OF CORRECTION

| | | |
|---|---|---|
| PATENT NO. | : 12,423,803 B2 | Page 1 of 1 |
| APPLICATION NO. | : 18/420426 | |
| DATED | : September 23, 2025 | |
| INVENTOR(S) | : Yatir Linden et al. | |

It is certified that error appears in the above-identified patent and that said Letters Patent is hereby corrected as shown below:

On the Title Page

Column 1, "(73) Assignee: KLA Con., Milpitas, CA (US)" should read --(73) Assignee: KLA Corporation, Milpitas, CA (US)--.

Signed and Sealed this
Fourth Day of November, 2025

John A. Squires
*Director of the United States Patent and Trademark Office*